(12) United States Patent
Khrapko et al.

(10) Patent No.: US 12,365,622 B2
(45) Date of Patent: Jul. 22, 2025

(54) CANE-BASED MULTICORE OPTICAL FIBER AND METHODS OF FORMING

(71) Applicant: CORNING INCORPORATED, Corning, NY (US)

(72) Inventors: Rostislav Radiyevich Khrapko, Corning, NY (US); Mark Alan McDermott, Prattsburgh, NY (US); Matthew Artus Tuggle, Corning, NY (US); Rene Yau Flores, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 506 days.

(21) Appl. No.: 17/749,244

(22) Filed: May 20, 2022

(65) Prior Publication Data

US 2022/0371952 A1    Nov. 24, 2022

Related U.S. Application Data

(60) Provisional application No. 63/191,543, filed on May 21, 2021.

(51) Int. Cl.
  *C03C 25/68*    (2006.01)
  *C03B 37/012*    (2006.01)
  *C03B 37/027*    (2006.01)

(52) U.S. Cl.
  CPC ........ *C03C 25/68* (2013.01); *C03B 37/01222* (2013.01); *C03B 37/027* (2013.01); *C03B 2203/34* (2013.01)

(58) Field of Classification Search
  None
  See application file for complete search history.

(56) References Cited

U.S. PATENT DOCUMENTS

| 4,360,990 A | 11/1982 | Hubbard et al. |
| 5,152,818 A | 10/1992 | Berkey et al. |

(Continued)

FOREIGN PATENT DOCUMENTS

| EP | 0630864 A2 | 12/1994 |
| EP | 2220008 A1 | 8/2010 |

(Continued)

OTHER PUBLICATIONS

Invitation to Pay Additional Fees and, Where Applicable, Protest Fee; PCT/US2022/029104; dated Aug. 3, 2022, 9 pages; European Patent Office.

(Continued)

*Primary Examiner* — Lisa L Herring
(74) *Attorney, Agent, or Firm* — Amy T. Lang

(57) ABSTRACT

A method of manufacturing an optical fiber, the method including mounting a glass sleeve in a selective etching apparatus. The sleeve comprising one or more axial through-holes, and the etching apparatus comprising a first end cap with a central aperture disposed therethrough, the first end cap being attached to a first surface of the sleeve. The method further including exposing the sleeve to an acid solution such that a first portion of the first surface is exposed to the acid solution and a second portion of the first surface is not exposed to the acid solution. The first portion being adjacent to the central aperture when the sleeve is mounted in the selective etching apparatus, and the second portion being covered by the first end cap when the sleeve is mounted in the selective etching apparatus.

20 Claims, 12 Drawing Sheets

(56) References Cited

U.S. PATENT DOCUMENTS

| | | | |
|---|---|---|---|
| 7,346,250 B1* | 3/2008 | Dabich, II | C03B 37/01228 |
| | | | 385/115 |
| 10,520,668 B2 | 12/2019 | Nagashima et al. | |
| 10,590,024 B2 | 3/2020 | Nagashima et al. | |
| 11,370,689 B2 | 6/2022 | Khrapko | |
| 2008/0142477 A1 | 6/2008 | Jacobs | |
| 2009/0218706 A1 | 9/2009 | Taru | |
| 2020/0235020 A1 | 7/2020 | Boek et al. | |
| 2020/0277219 A1* | 9/2020 | Khrapko | C03B 37/0126 |
| 2022/0315474 A1* | 10/2022 | Pandey | C03B 37/01231 |
| 2023/0382779 A1* | 11/2023 | Fukumoto | C03B 37/027 |

FOREIGN PATENT DOCUMENTS

| | | |
|---|---|---|
| JP | 2016-017019 A | 2/2016 |
| JP | 2017-075061 A | 4/2017 |
| WO | 2008/121270 A1 | 10/2008 |
| WO | 2009/083468 A1 | 7/2009 |

OTHER PUBLICATIONS

N. V. Toan, et al., "An investigation of processes for glass micromachining," Micromachines, vol. 7(3), 2016.

International Search Report and Written Opinion of the International Searching Authority; PCT/US2022/029104; mailed on Oct. 11, 2022, 16 pages; European Patent Office.

* cited by examiner

CANE-BASED MULTICORE OPTICAL FIBER AND METHODS OF FORMING

This Application claims the benefit of priority to U.S. Provisional Patent Application Ser. No. 63/191,543 filed on May 21, 2021, the content of which is relied upon and incorporated herein by reference in its entirety.

FIELD OF THE DISCLOSURE

The present disclosure is generally directed to cane-based multicore optical fibers, and more particularly relates to methods of forming cane-based multicore optical fibers using a vacuum-based method.

BACKGROUND OF THE DISCLOSURE

Multicore optical fibers have increased transmission capacity in communication systems over single core optical fibers. In a multicore optical fiber, a plurality of cores are surrounded by a single cladding such that light propagates through each core. An all-glass process can be used to fabricate a multicore optical fiber, which uses a bulk cladding glass with one or more precision-formed axial holes. The holes each accommodate a cane, and the canes form the cores of the multicore optical fiber.

An all-glass process may be preferred over deposition-based processes (e.g., an outside vapor deposition (OVD) process) involving soot layering, sintering, and consolidation to convert the soot to glass. With an all-glass process, the cladding glass can be precision ground to a select diameter, which provides both the precision and flexibility of choosing a variety of spacings, shapes, and arrangements of the one or more axial holes when forming the glass preform.

However, the all-glass process is relatively expensive and time consuming. The precision hole drilling takes time, the one or more canes need to be formed to define a select refractive index profile and then added to the cladding glass, and the entire structure needs to be consolidated in a furnace to form the solid glass preform. To make the glass preform of sufficient length, it may be necessary to axially combine separate glass cladding sections, which involves precise alignment of the axial holes. The consolidation process typically requires a special support fixture to hold the glass claddings sections and canes in a consolidation furnace to from the resulting solid glass preform. Then, the solid glass preform must be removed from the support fixture so that it can be moved from the consolidation furnace to a draw furnace for drawing of the preform into an optical fiber.

SUMMARY OF THE DISCLOSURE

The traditional all-glass process not only uses a significant number of resources to complete, it is also very time consuming. More specifically, the entire process requires about two days in order to allow the cladding glass to completely cool between each step. And, the process involves a substantial number of steps. The embodiments of the present disclosure reduce the number of steps and resources involved to produce an optical fiber from cladding glass. For example, the embodiments of the present disclosure reduce the number of steps so that the entire process can be performed in one single day. And, the embodiments of the present disclosure do not require separate consolidation and draw tower furnaces. Thus, the embodiments of the present disclosure provide a more economical and resourceful process to produce an optical fiber from the traditional processes.

An exemplary approach to solve the object is described by the independent claims. Various embodiments are defined with the dependent claims.

Aspects of the present disclosure comprise a method of manufacturing an optical fiber. The method comprising mounting a glass sleeve in a selective etching apparatus, the sleeve comprising one or more axial through-holes and the etching apparatus comprising a first end cap with a central aperture disposed therethrough, the first end cap being attached to a first surface of the sleeve. The method further comprising exposing the sleeve to an acid solution such that a first portion of the first surface is exposed to the acid solution and a second portion of the first surface is not exposed to the acid solution. The first portion being adjacent to the central aperture when the sleeve is mounted in the selective etching apparatus, and the second portion being covered by the first end cap when the sleeve is mounted in the selective etching apparatus.

Aspects of the present disclosure comprise a method of manufacturing an optical fiber. The method comprising forming a concave recess on a first surface of a glass sleeve, the concave recess being surrounded by a raised lip of the sleeve, and the sleeve comprising one or more axial through-holes. The method further comprises inserting a glass cane core into each of the axial-through holes and vacuum sealing the sleeve with one or more additional glass components to form an assembly.

Aspects of the present disclosure comprise a method of manufacturing an optical fiber. The method comprising inserting a glass cane core into an axial-through hole on a glass sleeve and simultaneously vacuum sealing the sleeve with one or more additional glass components, to form an assembly, while drawing the assembly to from an optical fiber.

Although many different embodiments are listed, the embodiments may exist individually or in any combination as possible. Hereinafter exemplary embodiments are shown and described.

DETAILED DESCRIPTION

Figure 1:
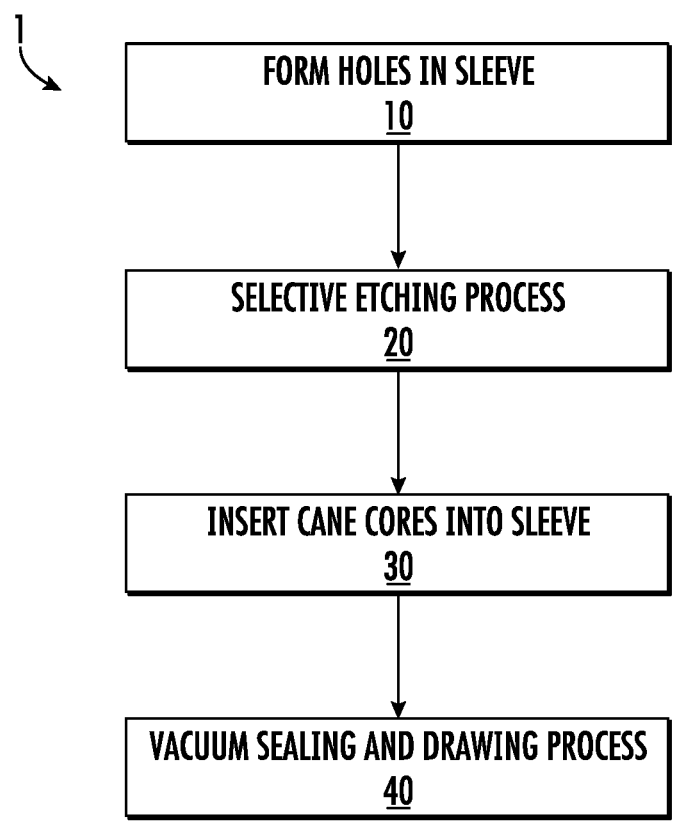
FIG. 1 is a process to produce a multicore optical fiber, according to embodiments of the present disclosure.

Additional features and advantages of the disclosure will be set forth in the detailed description which follows and will be apparent to those skilled in the art from the description, or recognized by practicing the disclosure as described in the following description, together with the claims and appended drawings.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions.

The expression "comprises" as used herein includes the term "consists of" as a special case, so that for example the expression "A comprises B and C" is understood to include the case of "A consists of B and C."

The term "consolidated" as the term is used herein means taking an assembly made of different glass components that are not bonded to one another and heating the assembly to just above the softening point of the glass components so that the glass components can flow and bond or seal to each other to form a unified glass component that maintains the general overall configuration of the glass components, i.e., the glass components do not substantially change their basic shape.

The term "axial hole" or "axial through-hole" means a hole that runs parallel to the axial direction, i.e., parallel to a central axis or centerline.

The term "cylindrical" as used herein means a three-dimensional shape formed by taking a two-dimensional shape and projecting it along a third dimension perpendicular to the plane of the two-dimensional shape. Thus, a cylinder as the term is used herein can have cross-sectional shapes other than circular.

It will be understood by one having ordinary skill in the art that construction of the described disclosure, and other components, is not limited to any specific material. Other exemplary embodiments of the disclosure disclosed herein may be formed from a wide variety of materials, unless described otherwise herein.

It is also important to note that the construction and arrangement of the elements of the disclosure, as shown in the exemplary embodiments, is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel and nonobvious teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures, and/or members, or connectors, or other elements of the system, may be varied, and the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present disclosure. Other substitutions, modifications, changes, and omissions may be made in the design, operating conditions, and arrangement of the desired and other exemplary embodiments without departing from the spirit of the present disclosure.

Reference will now be made in detail to the present preferred embodiments of the disclosure, examples of which are illustrated in the accompanying drawings. Whenever possible, the same reference numbers will be used throughout the drawings to refer to the same or like parts.

Referring now to FIG. 1, an exemplary process 1 is shown according to embodiments of the present disclosure. Process 1 is a system to produce a multicore optical fiber. However, it is also contemplated that process 1 may be used to produce a single core optical fiber. As shown in FIG. 1, step 10 of process 1 comprises forming holes in a glass sleeve. The holes are each sized to accommodate a cane core. Next, at step 20 a selective etching process is performed on the sleeve, which produces a recessed region on either end of the sleeve This recessed region is later used during a vacuum sealing process to seal multiple glass components together and provide a preform assembly. Then, at step 30, the cane cores are inserted into the holes. The vacuum sealing process along with a drawing process are performed at step 40. Advantageously, step 40 of process 1 performs the vacuum sealing process simultaneously with the drawing process. Each of the steps of process 1 are discussed further below in greater detail.

Figure 2:
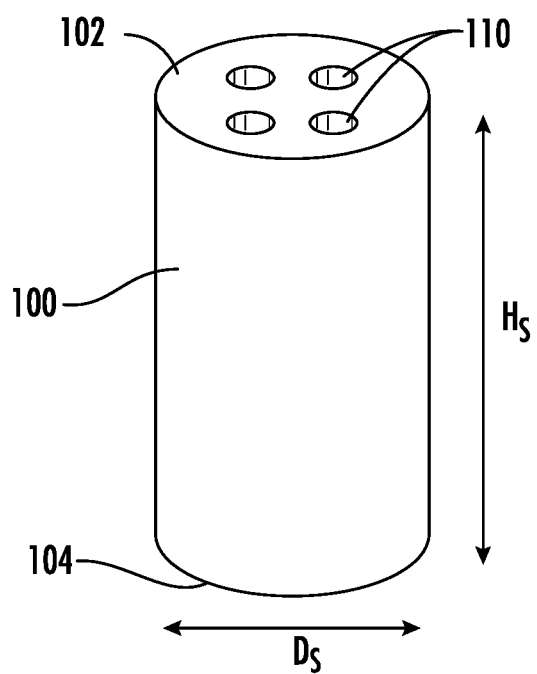
FIG. 2 illustrates a sleeve with one or more axial through-holes, according to embodiments of the present disclosure.

As shown in FIG. 2, holes 110 are formed in sleeve 100 at step 10 of process 1. In some embodiments, holes 110 are formed by precision drilling such as, for example, diamond abrasive core drilling and/or ultrasonic assisted core drilling. Sleeve 100 is a cylindrical glass body that comprises a top surface 102 and a bottom surface 104. Furthermore, sleeve 100 is comprised of silica (e.g., pure silica or doped silica). As shown in FIG. 2, sleeve 100 has a diameter $D_S$ and a height $H_S$. In some embodiments, the diameter $D_S$ is in a range from about 25 mm to about 200 mm or from about 50 mm to about 125 mm and the height $H_S$ is in a range from about 50 mm to about 2 m or from about 75 mm to about 1 m. In one exemplary embodiment, the diameter $D_S$ is about 70 mm and the height $H_S$ is about 110 mm. Other diameters and heights are contemplated as will be apparent to one skilled in the art.

Holes 110 are each an axial though-hole formed within an inner volume of sleeve 100. Although FIG. 2 shows four holes 110, it is also contemplated that sleeve 100 may comprise more or less holes 110. For example, sleeve 100 may comprise one or more holes, two or more holes, four or more holes, six or more holes, eight or more holes, ten or more holes, or twelve or more holes. Furthermore, holes 110 may have a circular cross-sectional shape, as shown in FIG. 2. It is also contemplated that holes 110 may comprise other cross-sectional shapes and that one or more holes may have a different cross-sectional shape from one or more other holes.

Holes 110 have an open, top end at top surface 102 of sleeve 100 and an open, bottom end at bottom surface 104 of sleeve 100. Thus, holes 110 each from a continuous opening from top surface 102 to bottom surface 104. In some embodiments, holes 110 have a diameter from about 2 mm to about 60 mm, or about 5 mm to about 45 mm, or about 10 mm to about 30 mm. It is also contemplated that one or more holes 110 may have a different diameter from one or more other holes.

Holes 110 may be spaced equidistantly from each other. Furthermore, holes 110 may be arranged in any configuration and layout as is known in the art.

At step 20 of process 1, a selective etching process is performed on sleeve 100. Before, the selective etching process, one or more surfaces of sleeve 100 can be polished or finely ground. For example, an outer surface of sleeve 100 can be polished or finely ground to obtain a precise diameter $D_S$ and/or a precise height $H_S$. Additionally or alternatively, the inner surfaces of holes 110 may be polished or finely ground. It also contemplated that top surface 102 and/or bottom surface 104 is polished or finely ground to obtain a precise flatness. In some embodiments, top and bottom surfaces 102, 104 are finely ground to obtain a surface roughness (RMS) of about 2 microns or less or about 1 micron or less.

Figure 3:
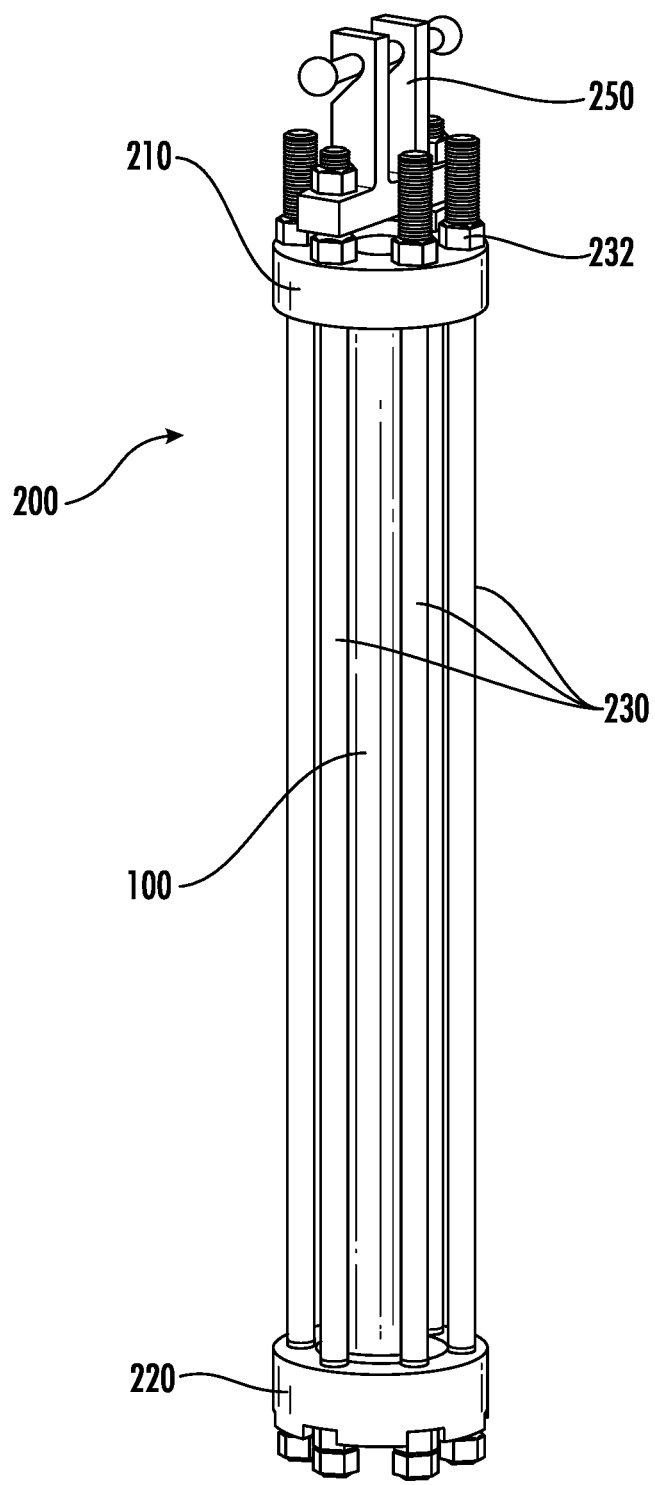
FIG. 3 illustrates a selective etching apparatus, according to embodiments of the present disclosure.

The selective etching process only etches a portion of sleeve 100 to provide recessed regions in top surface 102 and/or bottom surface 104 of sleeve 100. As discussed further below, these recessed regions are used in the vacuum sealing step. For the selective etching process, first an etching apparatus 200 is affixed to sleeve 100. At this time, sleeve 100 is a cylindrical member with flat and uniform top and bottom surfaces 102, 104. Thus, at this time, sleeve 100 does not yet include the recessed regions. As shown in FIG. 3, when mounted within etching apparatus 200, sleeve 100 is secured between a first end cap 210 and a second end cap 220 of apparatus 200. First end cap 210 is connected to top surface 102 of sleeve 100 and second end cap 220 is connected to bottom surface 104 of sleeve 100. As discussed further below, a plurality of rods 230 extend from first end cap 210 to second end cap 220 to secure etching apparatus 200 on and around sleeve 100.

First and second end caps 210, 220 may each be flange members that help to securely hold the connection between sleeve 100 and etching apparatus 200. End caps 210, 220 may be cylindrical shaped members with a central aperture extending from a top surface to a bottom surface of the end caps. Thus, end caps 210, 220 may be donut-shaped.

Figure 4A:
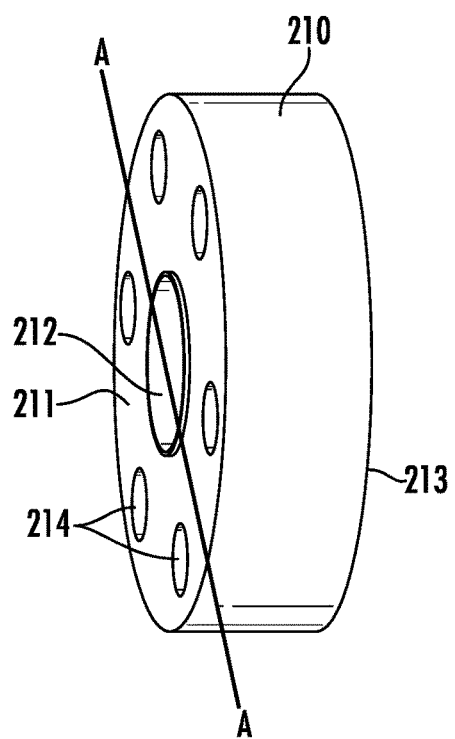
FIGS. 4A-4C illustrate enlarged, partial views of the selective etching apparatus of FIG. 3, according to embodiments of the present disclosure.
Figure 4B:
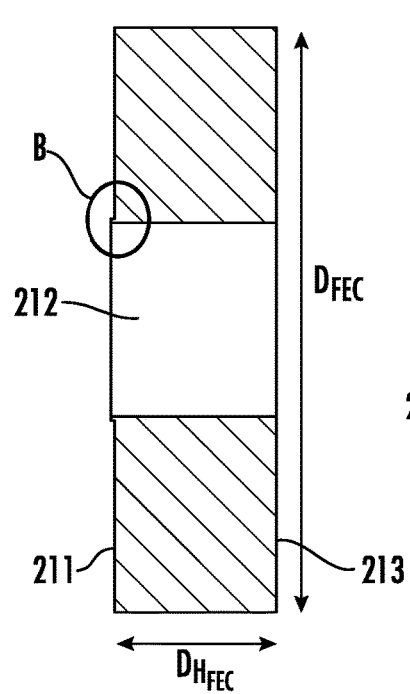

FIG. 4A shows a perspective view of first end cap 210, and FIG. 4B shows a cross-sectional view of first end cap 210 through line A-A of FIG. 4A. End cap 210 comprises a central aperture 212 for alignment with sleeve 100. Additionally, end cap 210 comprises a plurality of outer apertures 214, which are each sized to accommodate a rod 230, as discussed further below. Central aperture 212 and outer apertures 214 all extend through a full length of first end cap 210 from a first surface 211 to a second surface 213 of end cap 210. Central aperture 212 has a diameter ranging from about 30 mm to about 60 mm, or about 40 mm to about 50 mm, or about 42 mm to about 48 mm. Central aperture 212 has a diameter smaller than the diameter $D_S$ of sleeve 100. In some embodiments, the diameter of central aperture 212 is about 5 mm to about 10 mm smaller than the diameter $D_S$ of sleeve 100.

Furthermore, central aperture 212 has a diameter greater than a diameter of each of outer apertures 214, which each have a diameter ranging from about 10 mm to about 30 mm, or about 15 mm to about 25 mm, or about 18 mm to about 22 mm, or about 20 mm. However, the diameter of outer apertures 214 may vary depending on the size of rods 230. Outer apertures 214 may be spaced evenly around central aperture 212, such that outer apertures 214 are radially outward of central aperture 212.

Figure 4C:
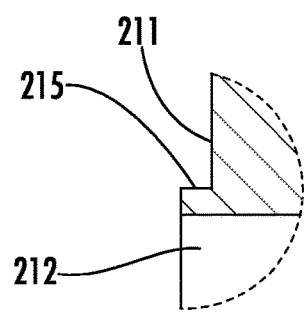

A total outer diameter $D_{FEC}$ of first end cap 210 may range from about 120 mm to about 160 mm, or about 130 mm to about 150 mm, or about 140 mm. Additionally, first end cap 210 may have a height $H_{FEC}$ (from first surface 211 to second surface 213) in a range from about 30 mm to about 50 mm, or about 35 mm to about 45 mm, or about 37 mm to about 39 mm, or about 39 mm. First end cap 210 may also comprise a protrusion 215 that extends radially outward from first surface 211. FIG. 4C depicts an enlarged view of section B of FIG. 4B in which protrusion 215 is shown. Protrusion 215 may extend a length of about 0.5 mm to about 1.5 mm, or about 0.75 mm to about 1.25 mm, or about 1 mm from first surface 211. Thus, a maximum height of first end cap 210 is the length from second surface 213 to protrusion 215 ($H_{FEC}$ plus the length of protrusion 215). As shown in FIG. 4C, protrusion 215 borders central aperture 212. A gasket may be disposed around protrusion 215 to secure sleeve 100 to first end cap 210, as discussed further below.

Figure 5A:
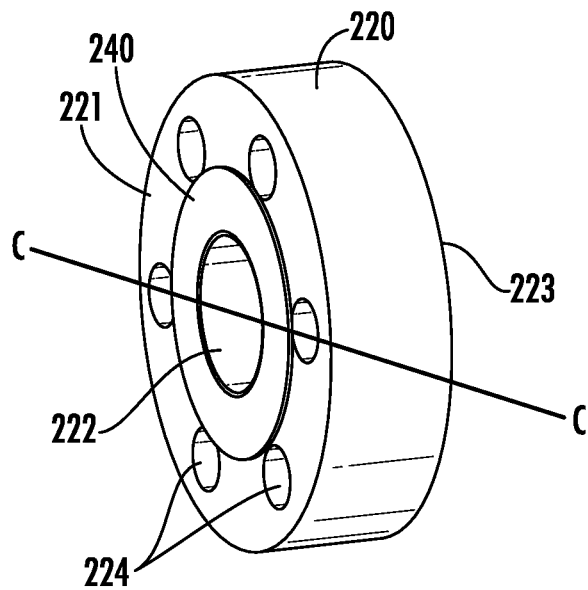
FIGS. 5A-5D illustrate additional enlarged, partial views of the selective etching apparatus of FIG. 3, according to embodiments of the present disclosure.
Figure 5B:
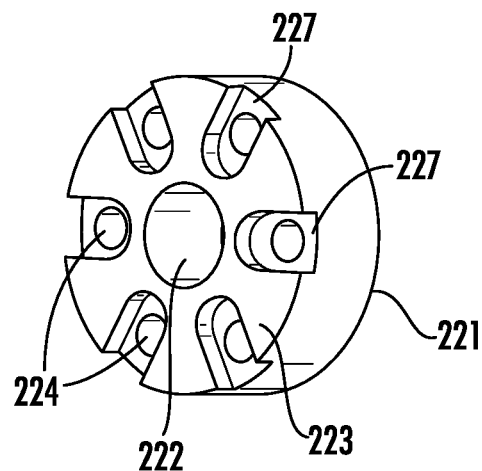
Figure 5C:
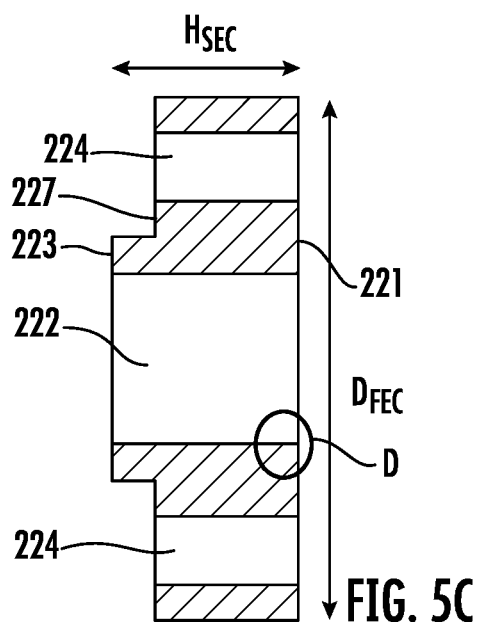

FIGS. 5A and 5B show first and second perspective views of second end cap 220. And, FIG. 5C shows a cross-sectional view of second end cap 220 through line C-C of FIG. 5A. Second end cap 220 comprises a central aperture 222 for alignment with sleeve 100, similar to first end cap 210. Additionally, second end cap 220 also comprises a plurality of outer apertures 224, which are each sized to accommodate a rod 230, as discussed further below. Central aperture 222 and outer apertures 224 all extend through a full length of second end cap 220 from a first surface 221 to a second surface 223 of end cap 220. FIG. 5A depicts an open end of apertures 222, 224 on first surface 221 of end cap 220, and FIG. 5B depicts an open end of apertures 222, 224 on second surface 223 of end cap 220.

Similar to first end cap 210, central aperture 222 of second end cap 220 has a diameter ranging from about 30 mm to about 60 mm, or about 40 mm to about 50 mm, or about 42 mm to about 48 mm. Central aperture 222 has a diameter smaller than the diameter $D_S$ of sleeve 100. In some embodiments, the diameter of central aperture 222 is about 5 mm to about 10 mm smaller than the diameter $D_S$ of sleeve 100.

Furthermore, central aperture 222 has a diameter greater than a diameter of each of outer apertures 224, which each have a diameter ranging from about 10 mm to about 30 mm, or about 15 mm to about 25 mm, or about 18 mm to about 22 mm, or about 20 mm. However, the diameter of outer apertures 224 may vary depending on the size of rods 230. Outer apertures 224 may be spaced evenly around central aperture 222, such that outer apertures 224 are radially outward of central aperture 222.

Second surface 223 of second end cap 220 may comprise a plurality of indentations 227, such that each outer aperture 224 is centered within an indentation 227. Thus, an opening of each outer aperture 224 is formed on an indentation 227. As discussed further below, indentations 227 help to secure rods 230 on etching apparatus 200.

A total diameter $D_{SEC}$ of second end cap 220 may range from about 120 mm to about 160 mm, or about 130 mm to about 150 mm, or about 140 mm. Thus, first and second end caps 210, 220 may have the same total diameter. Additionally, second end cap 220 may have a height $H_{SEC}$ (from first surface 221 to second surface 223) in a range from about 40 mm to about 60 mm, or about 45 mm to about 55 mm, or about 50 mm. Thus, second end cap 220 may have a larger height $H_{SEC}$ than the height $H_{FEC}$ of first end cap 210.

Figure 5D:
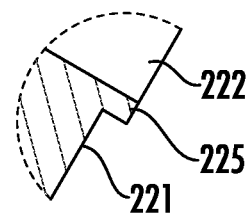

Second end cap 220 may also comprise a protrusion 225 that extends radially outward from first surface 221. FIG. 5D depicts an enlarged view of section D of FIG. 5C in which protrusion 225 is shown. Protrusion 225 may extend a length of about 0.5 mm to about 1.5 mm, or about 0.75 mm to about 1.25 mm, or about 1 mm from first surface 221. Thus, a maximum height of second end cap is the length from second surface 223 to protrusion 225 ($H_{SEC}$ plus the length of protrusion 225). As shown in FIG. 5D, protrusion 225 borders central aperture 222. A gasket 240 may be disposed around protrusion 225 to secure sleeve 100 to second end cap 220. FIG. 5A shows gasket 240 secured on first surface 221 of second end cap 220. Protrusion 225 helps to maintain gasket 240 securely fastened on first surface 221. In some embodiments, protrusion 225 forms a press fit with gasket 240. Although not shown in FIG. 4A, gasket 240 may also be attached to first surface 211 of first end cap 210 in the same manner as that described with reference to second end cap 220.

Figure 6:
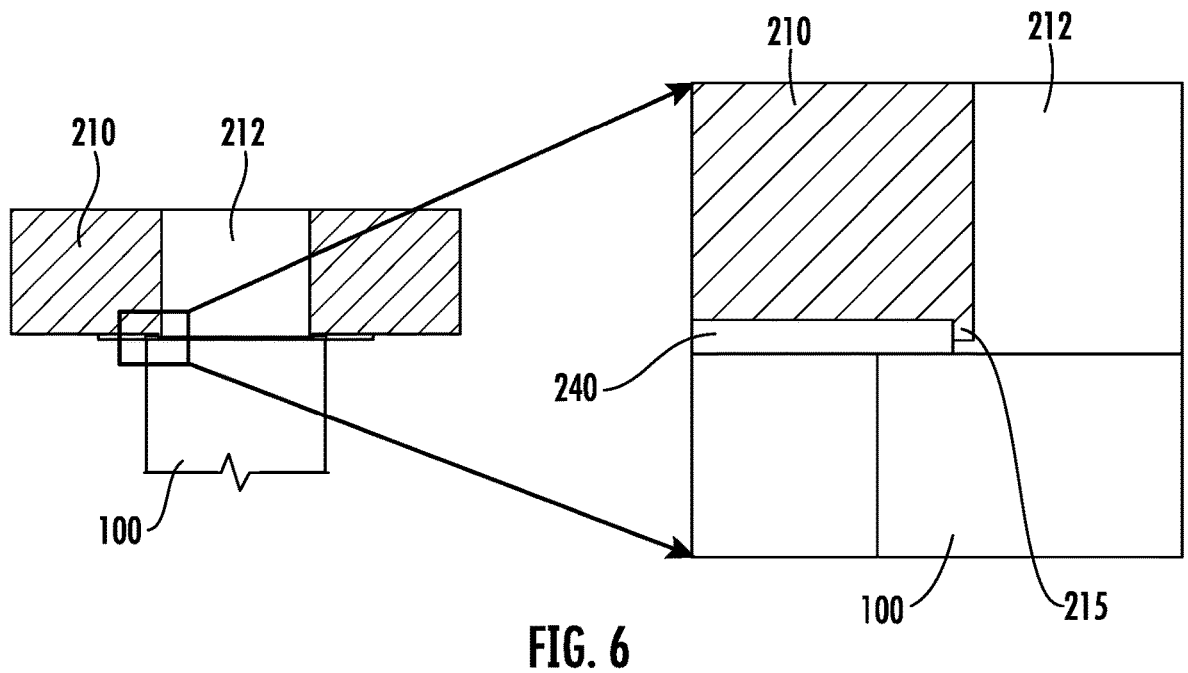
FIG. 6 is another illustration of an enlarged, partial view of the selective etching apparatus of FIG. 3, according to embodiments of the present disclosure.

FIG. 6 shows gasket 240 providing an attachment between sleeve 100 and first end cap 210. When sleeve 100 is secured to etching apparatus 200, gasket 240 is disposed between first end cap 210 and sleeve 100. Thus, gasket 240 provides a clearance so that first end cap 210 does not directly contact sleeve 100. Such advantageously helps to prevent first end cap 210 from exerting pressure on sleeve 100. As shown in FIG. 6, gasket 240 overlaps sleeve 100 in a radial, widthwise direction of sleeve 100 for a length of about 1 mm or less, or about 0.5 mm or less, or about 0.25 mm or less. Although gasket 240 is disclosed herein with regard to FIG. 6 in reference to first end cap 210, gasket 240 also functions the same with second end cap 220.

Referring again to FIG. 3, rods 230 are secured to first and second end caps 210 by extending through and within outer apertures 214, 224. Thus, when etching apparatus 200 is assembled, rods 230 extend within apertures 214, 224 such that they protrude outward from both first and second surfaces 211, 213 of first end cap 210 and protrude outward from both first and second surfaces 221, 223 of second end cap 220. A nut 232 may be secured around a protruding end of each rod 230 to maintain each rod 230 in position on etching apparatus 200. Furthermore, indentations 227 on second end cap 220 provide further means to secure nuts 232 on rods 230. More specifically, indentations 227 may decrease any relative displacement between rods 230 and end caps 210, 220. It is also noted that sleeve 100 keeps first and second end caps 210, 220 in place so that they cannot move closer towards each other.

In an alternative embodiment, second end cap 220 does not use nuts 232 to secure rods 230 to the end cap. Instead, in this embodiment, rods 230 are welded to second cap 220. Therefore, rods 230 and second cap 230 form one unitary member. In other embodiments, first and second end caps 210, 220 are maintained and secured on rods through friction alone.

When etching apparatus 200 is assembled and mounted to sleeve 100, rods 230 are radially spaced from sleeve 100. For example, rods 230 are spaced a distance of about 15 mm from an outer diameter of sleeve 100. Additionally, rods 230 may be radially spaced from adjacent rods, as shown in FIG. 3. The distance between each rod 230 may be about 36 mm.

As also shown in FIG. 3, etching apparatus 200 further includes a fastening member 250, which may form a U-shaped member for hanging on a hook. Fastening member 250 is used to hang etching apparatus 200 from a hook within an etching tank. It is also contemplated that fastening member 250 may comprise other shapes and configurations than that depicted in FIG. 3.

Once sleeve 100 is mounted within etching apparatus 200 and the apparatus is placed in an etching tank, sleeve 100 is etched and exposed to an acid solution. In some embodiments, the acid solution comprises hydrofluoric acid (HF), which may be diluted with deionized water. Additionally or alternatively, the acid solution comprises nitric acid ($HNO_3$) or sulfuric acid ($H_2SO_4$). Exemplary acid solutions include: (i) 10% by volume hydrofluoric acid and 15% by volume nitric acid, (ii) 5% by volume hydrofluoric acid and 7.5% by volume nitric acid, or (iii) 2.5% by volume hydrofluoric acid and 3.75% by volume nitric acid.

In some embodiments, a surfactant is added to the acid solution. The surfactant can be any suitable surfactant that dissolves into the acid solution and that does not react with the acid(s) in the acid solution. For example, the surfactant can be a fluorosurfactant such as Capstone® FS-50 or Capstone® FS-54. The concentration of the surfactant in the acid solution (in terms of ml of surfactant/L of acid solution) can be about 1, about 1.1, about 1.2, about 1.3, about 1.4, about 1.5, about 1.6, about 1.7, about 1.8, about 1.9, or about 2 or greater.

Sleeve 100 may be exposed to the acid solution for a total time (i.e., total etching time) of about 10 hours to about 5 minutes, or about 15 minutes to about 30 minutes. When sleeve 100 is exposed to the acid solution, the solution may be at a temperature of about 25° C. to about 35° C. In some embodiments, the acid solution is ultrasonically agitated when sleeve 100 is exposed to the acid solution.

Figure 7:
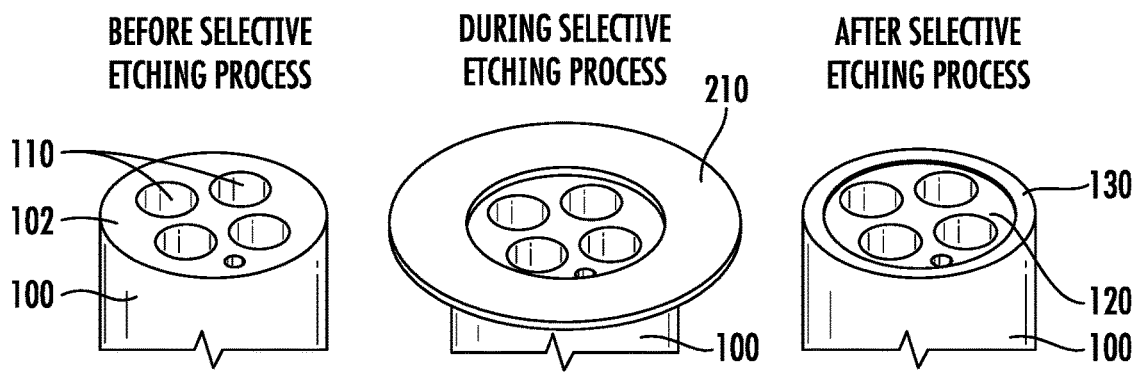
FIG. 7 is a schematic diagram illustrating a sleeve before, during, and after the selective etching process, according to the embodiments of the present disclosure.

During the selective etching process, when sleeve 100 is mounted within etching apparatus 200 and exposed to the acid solution, the acid solution is able to contact only specific portions of sleeve 100. More specifically and with reference to first end cap 210, the acid solution is able to flow within central aperture 212 and contact a portion of top surface 102 of sleeve. This portion is less than the entirety of top surface 102. Furthermore, as discussed above, central aperture 212 of first end cap 210 has a smaller diameter than the diameter $D_S$ of sleeve 100. Therefore, at least a portion of top surface 102 of sleeve 100 is covered by first end cap 210. More specifically, and as shown in FIG. 7, a radially outward portion of top surface 102 is covered by first end cap 210 during the etching process. Therefore, the acid solution does not contact this radially outward portion of sleeve 100 during the etching process, such that this radially outward portion is not etched by the acid solution during the etching process. Only the central portion of top surface 102 (the portion of top surface 102 that is exposed by central aperture 212) is etched during the etching process. As also shown in FIG. 7, this forms a recess 120 on top surface 102 surrounded by a raised lip 130 after the etching process. The central portion of top surface 102 (the portion of top surface 102 that is exposed by central aperture 212) forms recess 120 after the etching process, and the radially outward portion of top surface 102 (the portion that is covered by first end cap 210) forms raised lip 130 after the etching process.

Furthermore, the above-discussed selective etching process also applies to second end cap 220. During the etching process, the acid solution is able to flow within central aperture 222 of second end cap 220 and contact a portion of bottom surface 104 of sleeve. This portion is less than the entirety of bottom surface 104. Similar to first end cap 210, central aperture 222 of second end cap 220 has a smaller diameter than the diameter $D_S$ of sleeve 100. Therefore, at least a portion of bottom surface 104 of sleeve 100 is covered by second end cap 220. A radially outward portion of bottom surface 104 is covered by second end cap 220. Therefore, the acid solution does not contact this radially outward portion of sleeve 100 during the etching process, such that this radially outward portion is not etched by the acid solution during the etching process. Therefore, only the central portion of bottom surface 104 (the portion of bottom surface 104 that is exposed by central aperture 222) is etched during the etching process. This forms a recess 120 on top surface surrounded by a raised lip 130 after the etching process (similar to that described above with reference to first end cap 21).

Therefore, the above-disclosed etching process exposes top surface 102 (a first surface) of sleeve 100 to an acid solution such that a first portion of top surface 102 is exposed to the acid solution and a second portion of top surface 102 is not exposed to the acid solution. Similarly, the above-disclosed etching process exposes bottom surface 104 (a second surface) of sleeve 100 to an acid solution such that a first portion of bottom surface 104 is exposed to the acid solution and a second portion of bottom surface 104 is not exposed to the acid solution. It is noted that in FIG. 7, first end cap 210 is shown as a partial cutaway for clarity.

The shape and dimensions of recess 120 are dependent on the etch time of the acid solution. In some embodiments, recess 120 (on top surface 102 and/or bottom surface 104 of sleeve 100) has a maximum depth of about 20 microns or greater, or about 40 microns or greater, or about 60 microns or greater, or about 80 microns or greater, or about 100 microns or greater. Additionally or alternatively, recess 120 has a maximum depth of about 10 mm or less, or about 7 mm or less, or about 5 mm or less, or about 4 mm or less, or about 3 mm or less, or about 2 mm or less, or about 1 mm or less. In some embodiments, the maximum depth of recess 120 is in a range from about 40 microns to about 5 mm, or about 6 microns to about 4 mm.

Figure 8:
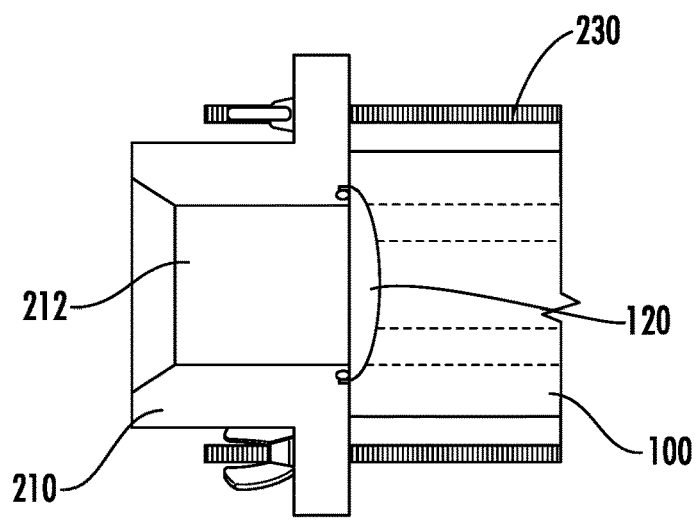
FIG. 8 illustrates a sleeve, attached to the selective etching apparatus, after the selective etching process.

Furthermore, recess 120 has a diameter in a range from about 30 mm to about 60 mm, or about 40 mm to about 50 mm, or about 42 mm to about 48 mm. In some embodiments, the diameter of recess 120 is the same as the diameter of aperture 212 and/or aperture 222. Therefore, raised lip 130 has a length, in a widthwise direction of sleeve 100, in a range from about 2.5 mm to about 10 mm, or from about 3 mm to about 5 mm. In some embodiments, as shown in FIG. 8, recess 120 (on top surface 102 and/or bottom surface 104 of sleeve 100) has a concave shape. As discussed further below, this concave shape provides advantages during the vacuum sealing process. The concave shape can be, for example, spherical or elliptical. Although FIGS. 7 and 8 depict recess 120 as having a circular cross-sectional shape, it is also contemplated that recess 120 can have other cross-sectional shapes such as, for example, square or rectangular.

As discussed above, raised lip 130 was not etched during the selective etching process. Therefore, raised lip 130 forms the polished surface of top surface 102 and/or bottom surface 104 of sleeve 100.

During the selective etching process step 20 of process 1, sleeve 100 is selectively etched to produce recesses 120. Additionally, the selective etching process advantageously provides an acid wash that removes contaminants on sleeve 100 and that polishes surfaces on sleeve 100. Thus, separate acid wash and polishing steps are not required. Instead, with the process disclosed herein, the selective etching process combines these steps into one. It is noted that the longer etching times (as discussed above) may be used when only top and bottom surfaces 102, 104 are etched rather than when the entire sleeve 100 is etched (except for the portions of sleeve 100 covered by first and second end caps 210, 220).

Figure 9:
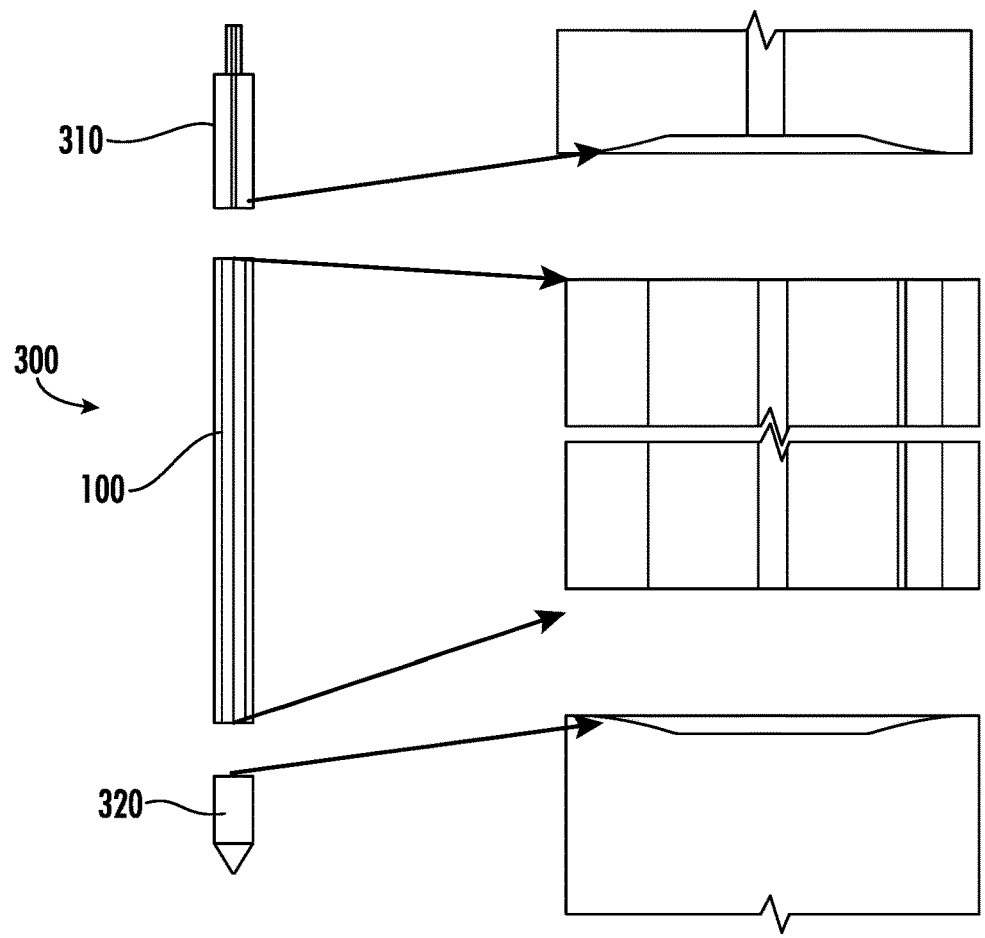
FIG. 9 illustrates another embodiment of the selective etching process, according to embodiments of the present disclosure.

As shown in FIG. 9, an assembled preform assembly 300 comprises a handle 310, sleeve 100, and a nosecone 320, each of which are formed of glass. As discussed further below, these components are sealed together during the vacuum sealing process. The selective etching process described above discloses that top surface 102 and bottom surface 104 of sleeve 100 are selectively etched to form recess 120 and raised lip 130 on sleeve 100. However, in alternative embodiments, a bottom surface of handle 310 and a top surface of nosecone 320 are selectively etched. In these embodiments, sleeve 100 is not selectively etched. Therefore, the recess and raised lip are formed on handle 310 and nosecone 320 rather than on sleeve 100. In some embodiments, the recess formed on handle 310 and/or nosecone 320 has a concave shape (as discussed above). In these embodiments in which handle 310 and nosecone 320 are etched, longer etching times may be used, such as, for example about 10 hours. It is also contemplated, in additional embodiments, that only one of handle 310 and nosecone 320 is selectively etched. Therefore, in this embodiment, one of top surface 102 and bottom surface 104 of sleeve 100 is also etched.

Figure 10A:
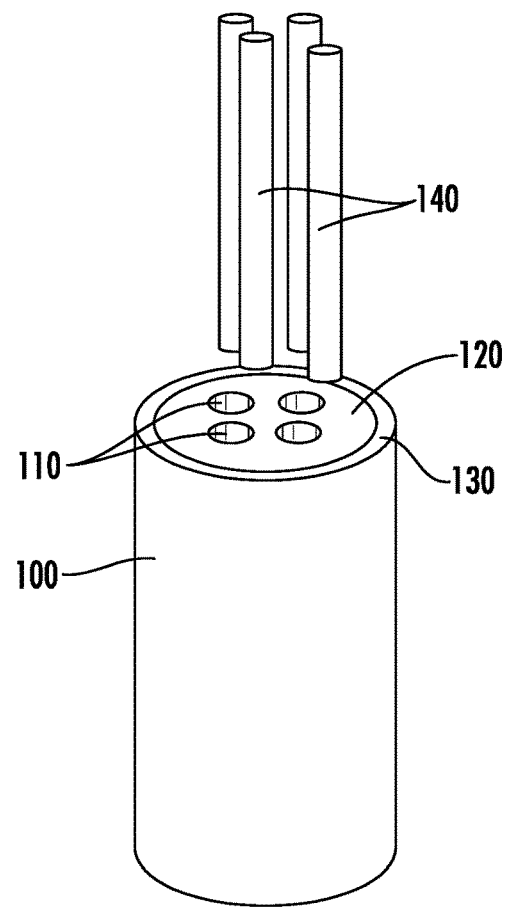
FIGS. 10A and 10B illustrate a process of inserting cane cores into a sleeve, according to embodiments of the present disclosure.
Figure 10B:
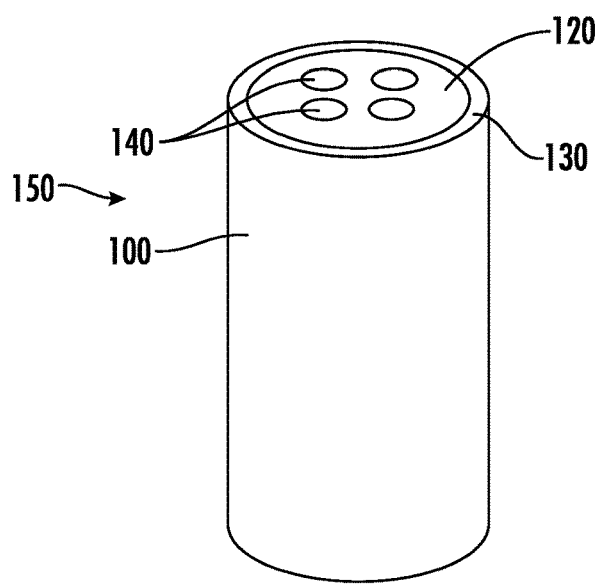
Figure 10C:
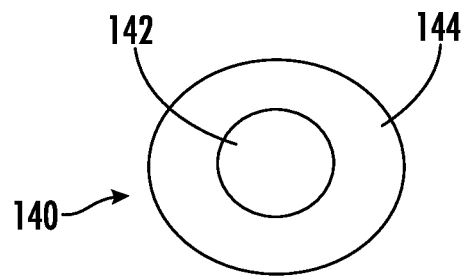
FIG. 10C illustrates a cross-sectional view of a cane core.

With reference again to FIG. 1, after completion of the selective etching process, cane cores are inserted into holes 110 of sleeve 100 at step 30 of process 1. FIG. 10A shows canes 140 operably disposed relative to holes 110 of sleeve 100 in the process of forming a cane-cladding assembly 150. FIG. 10B shows an exemplary assembled cane-cladding assembly 150, and FIG. 10C shows a cross-sectional view of one cane 140. Each cane 140 is formed of a glass body, which comprises a core section 142 and an inner cladding section 144 that surrounds core section 142. Furthermore, inner cladding section 144 can comprise one or more inner cladding portions having a different refractive index. It is also contemplated, in some embodiments, that the glass body of cane 140 consists of just core section 142 (without a cladding section). When cane-cladding assembly 150 is formed into a preform and then drawn into an optical fiber, sleeve 100 surrounds each cane 140. Thus, sleeve 100 forms an outer cladding section in the drawn optical fiber.

Figure 10D:
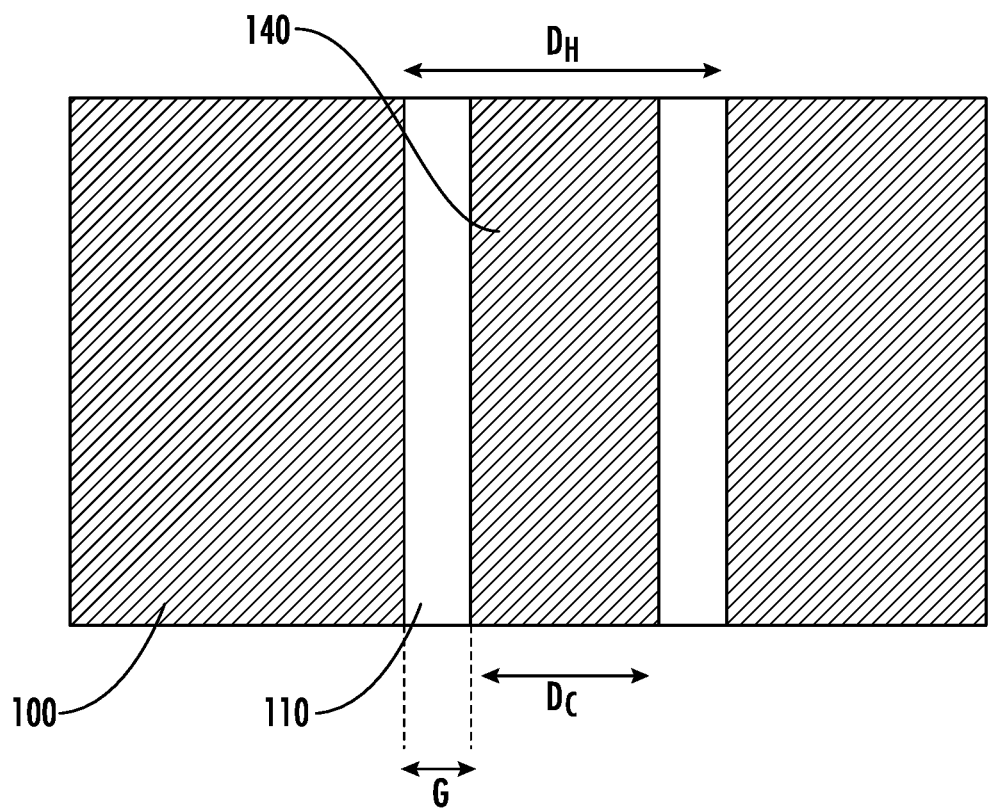
FIG. 10D illustrates a cross-sectional view of a sleeve with a cane core inserted therethrough.

FIG. 10D is a cross-sectional view of cane-cladding assembly 150 of FIG. 10B. As shown in FIG. 10D, in some embodiments, each cane 140 has a diameter Dc that is slightly smaller than a diameter DH of the corresponding hole 110 into which the cane 140 is inserted. Therefore, a gap G is provided between cane 140 and hole 110, which enables cane 140 to easily slide within hole 110. More specifically, gap G is provided between an outer surface of cane 140 and an inner surface of hole 110. In some embodiments, gap G has a length of about 2 mm or less, or about 1.5 mm or less, or about 1 mm or less, or about 0.75 mm or less, or about 0.5 mm or less, or about 0.25 mm or less. Additionally or alternatively, the length of gap G is about 0.1 mm or greater, or about 0.2 mm or greater, or about 0.4 mm or greater, or about 0.6 mm or greater, or about 0.8 mm or greater, or about 1 mm or greater. In some embodiments, the length of gap G is in range from about 0.1 mm to about 1 mm, or about 0.2 mm to about 0.8 mm. It is further noted that the length of gap G is a function of the size of sleeve 100. Smaller sleeves 100 with a smaller diameter $D_S$ require a smaller gap G length.

Figure 11:
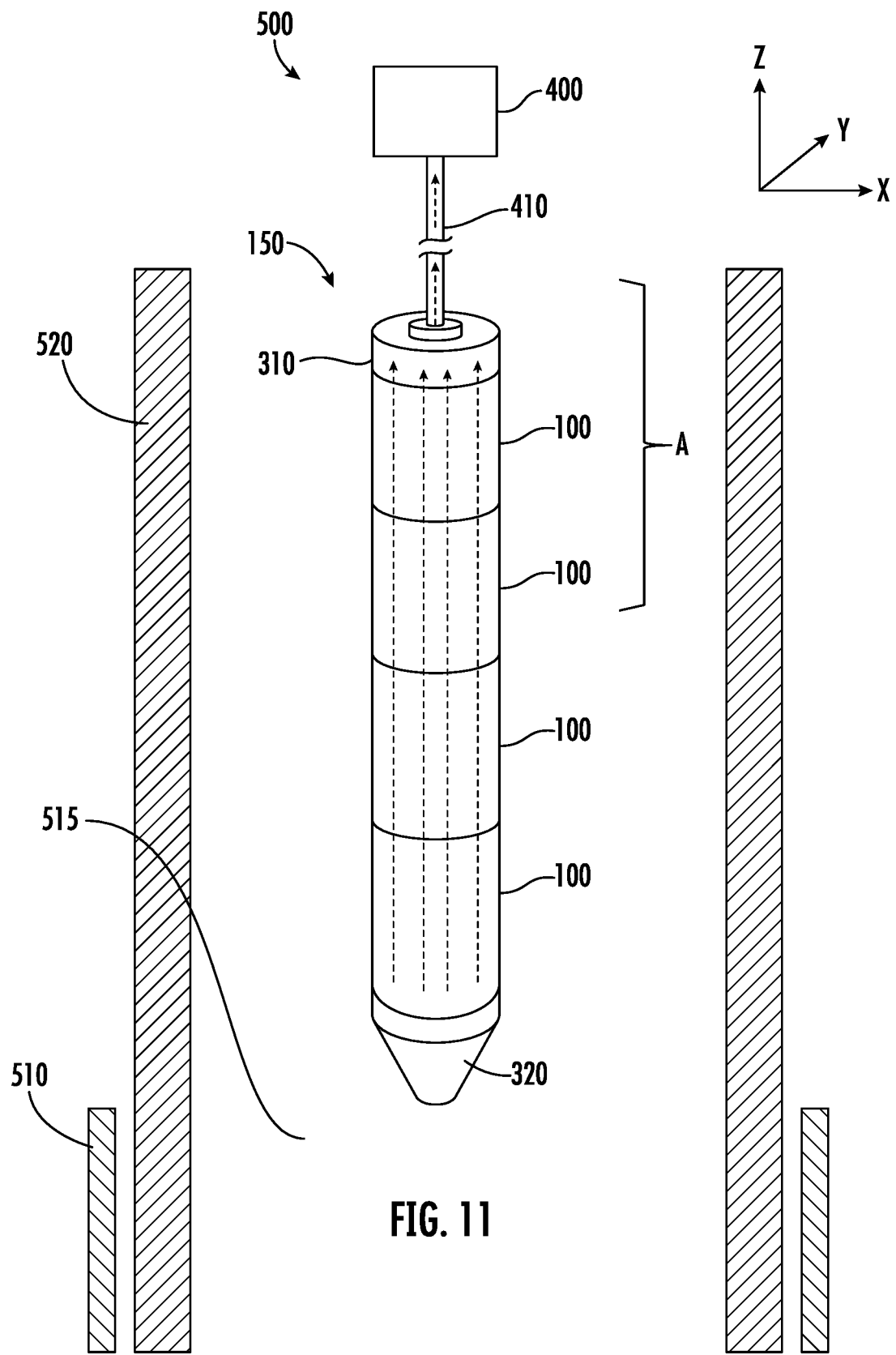
FIG. 11 illustrates a cross-sectional view of a cane-cladding assembly within a draw tower furnace and connected to a vacuum system, according to embodiments of the present disclosure.

Next, in process 1 of FIG. 1, after canes 140 are inserted into sleeve 100 to form cane-cladding assembly 150, a vacuum sealing and drawing process is performed at step 40. This vacuum and sealing and drawing process is performed to produce a preform and to draw the preform into an optical fiber. First, handle 310, sleeve 100 (with canes 140 inserted therein), and nosecone 320 are assembled in a stacked formation. When in the stacked formation, handle 310 is disposed vertically above sleeve 100, and sleeve 100 is disposed vertically above nosecone 320. It is also contemplated, in some embodiments, that the stacked formation includes a plurality of sleeves. FIG. 11 shows an exemplary stacked formation with four sleeves 100 disposed between handle 310 and nosecone 320. In this embodiment, canes 140 are each disposed through all four sleeves 100. Thus, all four sleeves share the same canes 140. As shown in FIG. 11, when in the stacked formation, handle 310 is in direct contact with the top-most sleeve 100 and each sleeve 100 is in direct contact with an adjacent sleeve 100. Furthermore, the bottom-most sleeve 100 is in direct contact with nosecone 320. It is also noted that handle 310, sleeve(s) 100, and nosecone 320 are cleaned (e.g., acid washed and then rinsed with deionized water) before being assembled into the stacked formation.

As also shown in FIG. 11, the stacked formation is connected to a vacuum system 400, such that the stacked formation and vacuum system 400 together comprise a preform system 500. Vacuum system 400 further comprises a conduit 410 that supports the stacked formation and provides an air flow connection between vacuum system 400 and the stacked formation. As discussed further below, vacuum system 400 uses pneumatic pressure to seal together handle 310, sleeve(s) 100, and nosecone 320 when in the stacked formation.

Figure 12:
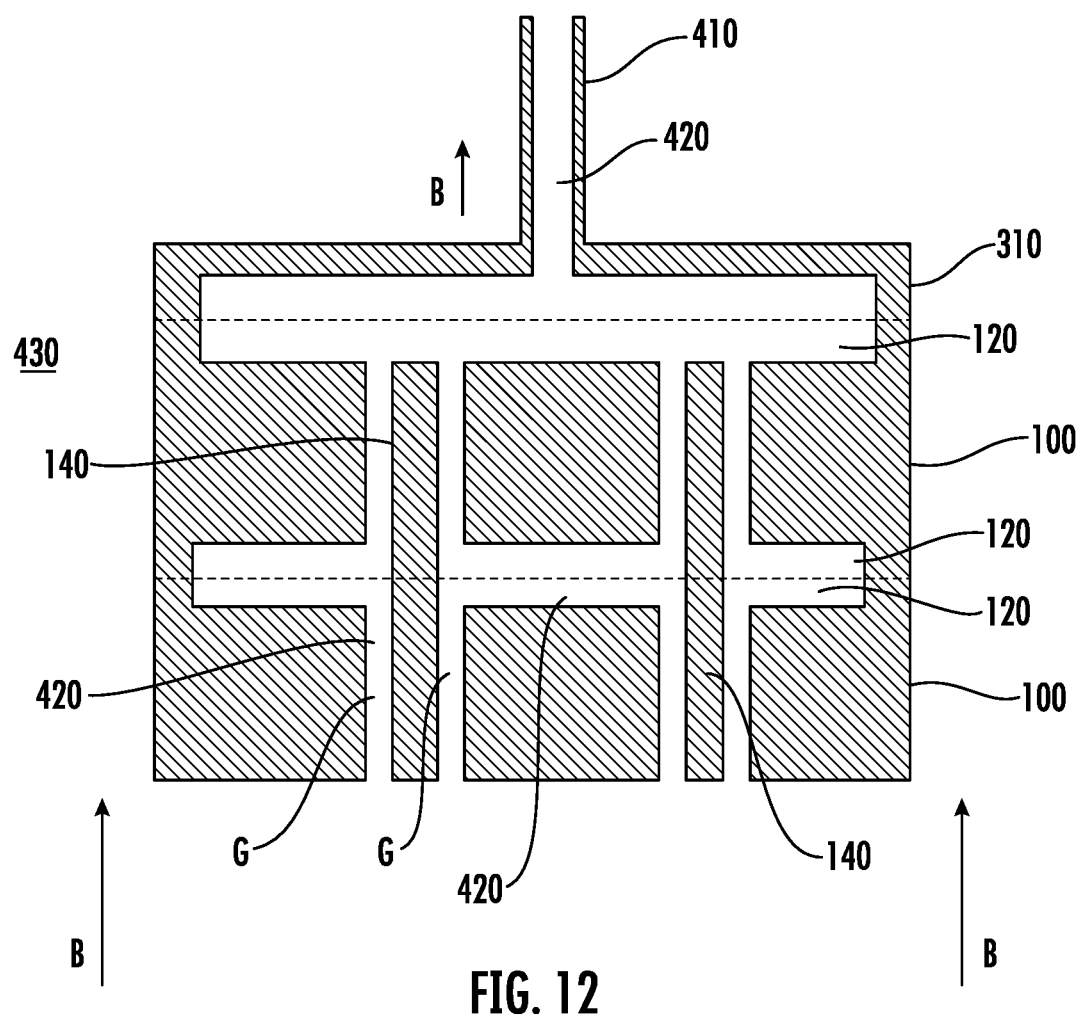
FIG. 12 illustrates an internal channel of the cane-cladding assembly, according to embodiments of the present disclosure.

FIG. 12 depicts a partial cross-sectional view of portion A of preform system 500 of FIG. 11 in which two sleeves 100 are shown in the stacked formation. The top sleeve 100 is connected to handle 310. It is noted that nosecone 320 is not depicted in this partial view. As shown in FIG. 12, a first recess 120 on a bottom surface of the topmost sleeve 10 is connected with a second recess 120 on a top surface of the adjacent sleeve 100. Furthermore, all the recesses 120 on the plurality of sleeves 100 are connected together with the space formed by gaps G (between sleeves 100 and canes 140) and are connected with a channel through conduit 410 to form a continuous, internal channel 420. This channel 420 is substantially sealed due to the contact between the sufficiently smooth glass surfaces of handle 310, sleeve(s) 100, and nosecone 320. Although not depicted in FIG. 12, channel 420 extends through the entire stack formation down to nosecone 320. Furthermore, channel 420 is connected to vacuum system 400 to provide a pneumatic flow path.

When activated, vacuum system 400 pulls air from channel 420 and into vacuum system 400, as shown by air flow lines B in FIG. 12. Because channel 420 is substantially sealed, the vacuum pull creates a substantial pressure differential $\Delta P$ between channel 420 and the ambient environment 430 surrounding preform system 500. This pressure differential $\Delta P$ causes handle 310, sleeve(s) 100, and nosecone 320 to be squeezed and sealed together when oriented vertically in the stacked formation. Thus, these components are squeezed and sealed together against the force of gravity. In an example, the pressure differential $\Delta P$ between vacuum system 400 and normal ambient pressure at sea level provides an axial compressive force of 98.5 kg on a typical assembly in which sleeves 100 have a diameter $D_S$ of 122 mm and channel 420 has a maximum diameter of 112 mm. In other embodiments, the pressure differential $\Delta P$ can be on the order of about 100 kg, with the exact value depending on the weight of the various components of preform assembly 500 and the sizes of the various sections of channel 420, as will be apparent to one skilled in the art.

The vacuum pull of vacuum system 400 forms a vacuum-held-together ("vacuum-held") cane-cladding assembly 150. Thus, handle 310, sleeve(s) 100, and nosecone 320 are squeezed and sealed together and channel 420 is eliminated. When handle 310, sleeve(s) 100, and nosecone 320 are squeezed and sealed together, recesses 120 (when having the concave configuration of FIG. 8) deform by sealing the glass components first on a radially outward portion of recess 120 before a central portion of the recess 120. Thus, the sealing of the glass components (handle 310, sleeve(s) 100, and/or nosecone 320) starts at the radially outward end of recess 120 and then moves radially inward until the glass components are sealed together. This creates a stronger bond between the glass components than when a non-concave shaped recess 120 is used. In contrast, when using a non-concave shaped recess 120, the glass components seal together, at the same time, at the radially outward portions and central portions of the recess.

It is also noted that in some embodiments, recesses 120 are formed on handle 310 and/or nosecone 320 rather than on sleeves 100, as discussed above with reference to FIG. 9. In these embodiments, channel 420 is formed by the recesses 120 on handle 310 and/or nosecone and the components are sealed together, similar to that described above with reference to FIG. 12.

In a traditional sealing and drawing processes, a cane-cladding assembly is first vacuum sealed and then consolidated in a consolidation furnace at a temperature of about 1100° C. and in a chlorine atmosphere. This consolidation step bonds together the glass components of the cane-cladding assembly. After the consolidation step, the assembly is annealed at a temperature of about 1400° C. to about 1500° C. After completion of the annealing step, the assembly is now a preform, which is moved from the consolidation furnace to a draw tower furnace for drawing the preform into an optical fiber. Therefore, in the traditional processes, the preform assembly is first vacuum sealed before it is moved to the draw tower furnace for drawing into an optical fiber. The embodiments of the present disclosure combine these two steps by simultaneously vacuum sealing the assembly during the drawing step. Furthermore, the embodiments of the present disclosure do not have separate consolidation and annealing steps as in the traditional processes. Therefore, the embodiments of the present disclosure reduce the total number of steps, which requires less time and saves money. Furthermore, in the traditional processes, the glass assembly must be cooled and relaxed between steps (such as the annealing and drawing steps). Each cooling steps brings the potential for failure due to intrinsic stresses resulting from non-uniform heating or cooling of the large pieces of glass. The embodiments of the present disclosure reduce the total number of steps and, therefore, reduce such potential for intrinsic stress in the glass. Furthermore, the embodiments of the present disclosure do not require that the preform be moved from the consolidation furnace to the draw tower furnace, during which the preform can be scratched or chipped. And, the embodiments of the present disclosure do not require two separate consolidation and draw tower furnaces.

As disclosed above, embodiments of the present disclosure simultaneously perform the vacuum sealing and drawing processes. Therefore, during the above-disclosed vacuum sealing process, cane-cladding assembly 150 is disposed in a draw tower furnace 520, which is heated by a lower heater 510. As shown in FIG. 11, lower heater 510 creates a hot zone 515 within furnace that has a temperature within the range of about 1500° C. or greater, or about 1600° C. or greater, or about 1700° C. or greater, or about 1800° C. or greater, or about 1900° C. or greater or about 2000° C. or greater. In some embodiments, the temperature of hot zone 515 is in a range from about 1600° C. to about 2200° C. or about 1800° C. to about 2100° C. The temperature of hot zone 515 is sufficient to consolidate cane-cladding assembly 150 (to bond the glass components together) and to heat cane-cladding assembly 150 to its glass melt temperature (for the drawing step). It is noted that the temperature of hot zone 515 is greater than that of a traditional consolidation furnace, as discussed above.

When disposed within furnace 520, cane-cladding assembly 150 is slowly lowered towards lower heater 510 as cane-cladding assembly 150 is consumed and drawn into an optical fiber. Furthermore, the above-disclosed vacuum sealing process is conducted simultaneously as cane-cladding assembly 150 is slowly lowered towards lower heater 510. Therefore, the vacuum pull from vacuum system 400 is conducted while cane-cladding assembly 150 is being consumed and drawn into an optical fiber. Furnace 520 may comprise one or more inert gases in addition to cane-cladding assembly 500.

Figure 13:
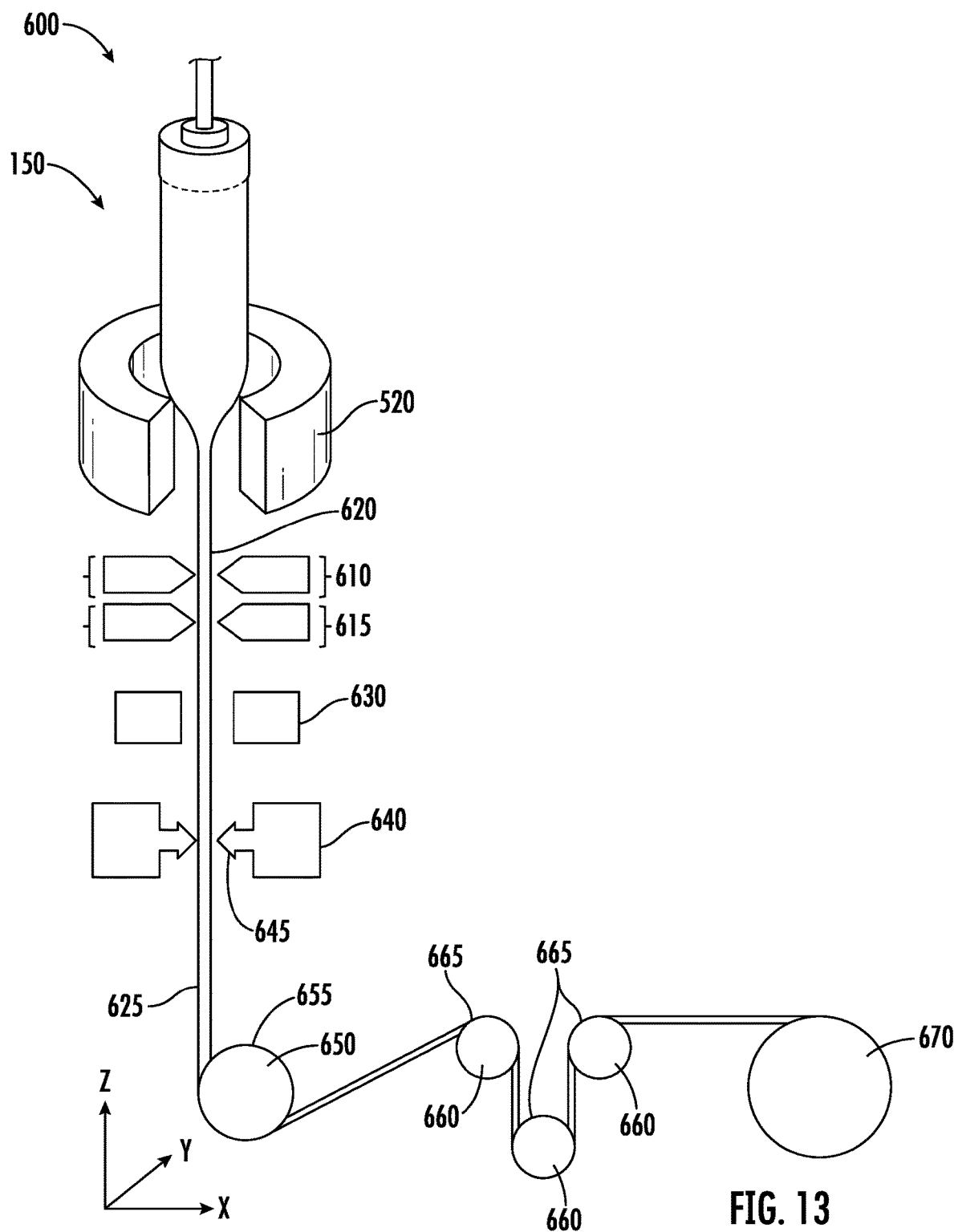
FIG. 13 is a schematic diagram illustrating an exemplary drawing system.

FIG. 13 shows a drawing system 600 for drawing an optical fiber according to the embodiments disclosed herein. Exemplary drawing system 600 comprises furnace 520, as discussed above. Furthermore, drawing system 600 comprises non-contact measurement sensors 610, 615 for measuring the size (e.g., diameter control) of a drawn (bare) fiber 620 that exits furnace 520. A cooling station 630 resides downstream of the measurement sensors 610, 615 and is configured to cool the bare fiber 620. A coating station 640 resides downstream of cooling station 630 and is configured to deposit a protective coating material 645 onto the bare fiber 620 to form a coated fiber 625. A tensioner 650 resides downstream of the coating station 640. The tensioner 650 has a surface 655 that pulls (draws) the coated fiber 625. A set of guide wheels 660 with respective surfaces 665 resides downstream of the tensioner 650. The guide wheels 660 serve to guide the coated fiber 625, to a fiber take-up spool ("spool") 670 to store the coated fiber 625. Embodiments of the present disclosure can be used to form a single core optical fiber or a multicore optical fiber.

While various embodiments have been described herein, they have been presented by way of example only, and not limitation. It should be apparent that adaptations and modifications are intended to be within the meaning and range of equivalents of the disclosed embodiments, based on the teaching and guidance presented herein. It therefore will be apparent to one skilled in the art that various changes in form and detail can be made to the embodiments disclosed herein without departing from the spirit and scope of the present disclosure. The elements of the embodiments presented herein are not necessarily mutually exclusive, but may be interchanged to meet various needs as would be appreciated by one of skill in the art.

It is to be understood that the phraseology or terminology used herein is for the purpose of description and not of limitation. The breadth and scope of the present disclosure should not be limited by any of the above-described exemplary embodiments, but should be defined only in accordance with the following claims and their equivalents.

What is claimed is:

1. A method of manufacturing an optical fiber, the method comprising:
   mounting a glass sleeve in a selective etching apparatus, the sleeve comprising one or more axial through-holes, and
   the etching apparatus comprising a first end cap with a central aperture disposed therethrough, the first end cap being attached to a first surface of the sleeve; and
   exposing the sleeve to an acid solution such that a first portion of the first surface is exposed to the acid solution and a second portion of the first surface is not exposed to the acid solution,
   the first portion being adjacent to the central aperture when the sleeve is mounted in the selective etching apparatus, and
   the second portion being covered by the first end cap when the sleeve is mounted in the selective etching apparatus.

2. The method of claim 1, wherein exposing the sleeve to the acid solution forms a recess in the first portion of the sleeve.

3. The method of claim 2, wherein the recess is surrounded by a raised lip of the sleeve, the raised lip being the second portion of the sleeve.

4. The method of claim 2, further comprising inserting a glass cane core into each of the one or more axial through-holes.

5. The method of claim 4, further comprising a gap between the cane cores and the axial through-holes, the gap having a diameter of about 1 mm or less.

6. The method of claim 4, further comprising attaching the sleeve, with the cane cores inserted therethrough, to a glass handle and a glass nosecone to form an assembly.

7. The method of claim 6, the assembly comprising an internal channel formed by the recess.

8. The method of claim 7, further comprising exposing the assembly to a vacuum sealing process in which a vacuum system creates a vacuum pull through the channel.

9. The method of claim 8, wherein the vacuum sealing process is conducted in a draw tower furnace.

10. The method of claim 8, further comprising simultaneously drawing an optical fiber from the assembly while exposing the assembly to the vacuum sealing process.

11. The method of claim 2, wherein the recess is a concave recess.

12. The method of claim 2, wherein the recess has a depth of about 40 microns or greater.

13. The method of claim 2, wherein the recess has a depth of about 10 mm or less.

14. The method of claim 2, wherein the recess has a depth in range from about 40 microns to about 5 mm.

15. The method of claim 2, further comprising forming a second recess on a second surface of the sleeve.

16. The method of claim 1, wherein the acid solution comprises hydrofluoric acid.

17. A method of manufacturing an optical fiber, the method comprising:
- forming a concave recess on a first surface of a glass sleeve, the concave recess being surrounded by a raised lip of the sleeve, and the sleeve comprising one or more axial through-holes;
- inserting a glass cane core into each of the axial-through holes; and
- vacuum sealing the sleeve with one or more additional glass components to form an assembly.

18. The method of claim 17, further comprising simultaneously vacuum sealing the sleeve to form the assembly while drawing the assembly to form an optical fiber.

19. A method of manufacturing an optical fiber, the method comprising:
- inserting a glass cane core into an axial-through hole on a glass sleeve, the sleeve comprising a concave recess on a first surface of the sleeve; and
- simultaneously vacuum sealing the sleeve with one or more additional glass components, to form an assembly, while drawing the assembly to form an optical fiber.

20. The method of claim 19, wherein the assembly comprises the sleeve, a glass handle, and a glass nosecone.

* * * * *